(12) United States Patent
Barlow et al.

(10) Patent No.: US 7,011,242 B2
(45) Date of Patent: Mar. 14, 2006

(54) COATED STAPLE AND FASTENING TOOL FOR THE SAME

(75) Inventors: Van Barlow, New Hampton, NH (US); Onno Boswinkel, Merrimack, NH (US); Robert Haynes, Bristol, NH (US); Richard Gold, Weston, MA (US)

(73) Assignee: Acme Staple Company, Inc., West Franklin, NH (US)

( * ) Notice: Subject to any disclaimer, the term of this patent is extended or adjusted under 35 U.S.C. 154(b) by 0 days.

(21) Appl. No.: 10/017,746

(22) Filed: Dec. 7, 2001

(65) Prior Publication Data

US 2003/0115738 A1 Jun. 26, 2003

(51) Int. Cl.
*B25C 5/00* (2006.01)
(52) U.S. Cl. ...................... 227/120; 132/902
(58) Field of Classification Search ................ 227/120, 227/140, 132, 136, 902; 411/903, 258, 442, 411/446, 452; 118/122, 117, 67, 68; 29/428; 427/446, 388.4
See application file for complete search history.

(56) References Cited

U.S. PATENT DOCUMENTS

| 3,146,142 | A | 8/1964 | Maly ........................... 156/91 |
| 3,252,569 | A | 5/1966 | Matthews ..................... 206/56 |
| 3,757,629 | A | 9/1973 | Schneider ...................... 85/49 |
| 3,813,985 | A | 6/1974 | Perkins .......................... 85/49 |
| 3,853,606 | A | 12/1974 | Parkinson ................. 117/128.4 |
| 3,958,738 | A | 5/1976 | Tremblay ..................... 227/109 |
| 4,655,222 | A | 4/1987 | Florez et al. ............ 128/334 R |
| 4,664,733 | A | 5/1987 | Masago ....................... 156/212 |
| 4,732,309 | A | 3/1988 | Judge .......................... 227/109 |
| 5,149,237 | A | 9/1992 | Gabriel et al. ............. 411/446 |
| 5,178,903 | A | * | 1/1993 | Lat et al. ..................... 427/446 |
| 5,441,373 | A | * | 8/1995 | Kish et al. ................... 227/120 |
| 5,476,687 | A | 12/1995 | Gabriel et al. ............. 427/435 |
| 5,735,444 | A | * | 4/1998 | Wingert ....................... 227/120 |
| 5,794,832 | A | 8/1998 | Chen .......................... 227/109 |
| 5,882,405 | A | * | 3/1999 | Kish et al. .................. 118/122 |
| 5,884,829 | A | 3/1999 | Wingert ....................... 227/151 |
| 5,931,364 | A | 8/1999 | Dennis ........................ 227/109 |
| 6,082,604 | A | 7/2000 | Dennis ........................... 227/8 |
| 6,095,737 | A | 8/2000 | Barker et al. ............... 411/359 |

* cited by examiner

*Primary Examiner*—Scott A. Smith
(74) *Attorney, Agent, or Firm*—Kevin S. Lemack

(57) ABSTRACT

Insulated or coated staple and a fastening tool for driving the same into a substrate. The tool includes a housing and a driver reciprocally mounted in the housing and moveable with respect to the housing, the driver having a driving surface for engaging a fastener such as a coated staple. A magazine assembly is associated with the housing for positioning and aligning the coated fastener in the path of the driver so that when actuated, the driver strikes the fastener and forcibly ejects it from the magazine into the substrate on which the object to be fastened is to be secured. Suitable fasteners include coated staples (of various sizes and configurations), nails, brads, rivets, etc.

15 Claims, 5 Drawing Sheets

COATED STAPLE AND FASTENING TOOL FOR THE SAME

BACKGROUND OF THE INVENTION

The present invention is directed towards a coated staple and a staple gun or fastener driving or applying tool for driving such staples into surfaces.

Staple, nail, brad, screw and other fastener-driving applying tools for industrial, commercial and do-it-yourself (DIY) use are well known. Often such tools are used to secure cables, wires, tubing and the like to a substrate such as wood by driving the fastener into the substrate, the fastener thereby surrounding the cable, wire or tubing on three sides. However, the fastener being applied may at the time of application (due to the impact of the fastener) or subsequently (due to wire and/or substrate expansion or contraction over time) penetrate, damage or deform the item being fastened, resulting in an electrical short circuit, leak or other deleterious effect.

It is often desirable to secure wire or cable, including without limitation high speed transmission multimedia cable and wire (such as CAT-5 and RG6) and NM Building Wire (also known as "Romex" wire), to substrates using staples and so-called insulators. The use of these so-called insulators, which may also provide a cushioning function, minimizes the possibility that the staple will penetrate, damage or deform the sheathing on the wire and cause an electrical short or change in current. The use of pre-assembled individual staples and insulators, installed by means of a hammer or similar implement, is conventional. However, this method is slow, tedious, and not very precise.

Attempts to improve the efficiency and standardization of the current process have largely focused on use of hand powered cable tacker staplers to install collated and cohered pre-assemblies of staples and so-called insulators. Each individual assembly of a staple and insulator has tended to be similar in essential form to the hammer-applied assemblies now widely employed. These attempts have proved to be inadequate and unsuccessful because they either do not install the staple/insulator assemblies in a manner which meets industry requirements for staple holding power (such as those described in UL specifications) for a wide range of wire types and diameters used in typical residential and commercial construction, or the cable tacker staplers used require too much hand pressure or too broad a range of hand motion for the average user to comfortably operate them so that they install the assemblies in accordance with such industry requirements. In addition, the quantity of staples/insulators that fit in a typically sized magazine is small, resulting in frequent reloading. This type of staple/insulator assembly is also relatively expensive.

It is therefore an object of the present invention to provide an improved insulated or coated fastener which helps minimize or eliminate the possibility that the fastener penetrates, damages or deforms the sheathing of the wire being fastened.

It is a further object of the present invention to provide an improved fastener driving tool or gun that ensures consistent, uniform and reproducible driving depth of the fastener into the substrate.

It is a still further object of the present invention to provide a fastening device that automatically and repeatably drives insulated or coated fasteners to a predetermined depth into a substrate to secure an object therein.

It is a still further object of the present invention to provide a fastener gun driven insulated or coated fastener which is relatively less expensive than those currently in use.

It is a still further object of the present invention to provide a system of a fastening device and a more compact insulated or coated staple or fastener which requires less frequent reloading.

SUMMARY OF THE INVENTION

The problems of the prior art have been overcome by the present invention, which provides an insulated or coated staple and a fastening tool for driving the same into a substrate. The tool includes a housing and a driver reciprocally mounted in the housing and moveable with respect to the housing, the driver having a driving surface for engaging a fastener such as a coated staple. A magazine assembly is associated with the housing for holding one or more coated fasteners, and for positioning and aligning a coated fastener in the path of the driver so that when actuated, the driver strikes the fastener and forcibly ejects it from the magazine into the substrate onto which the object to be fastened is to be secured. Suitable fasteners include coated staples (of various sizes and configurations), nails, brads, rivets, etc.

DETAILED DESCRIPTION OF THE INVENTION

Figure 1:
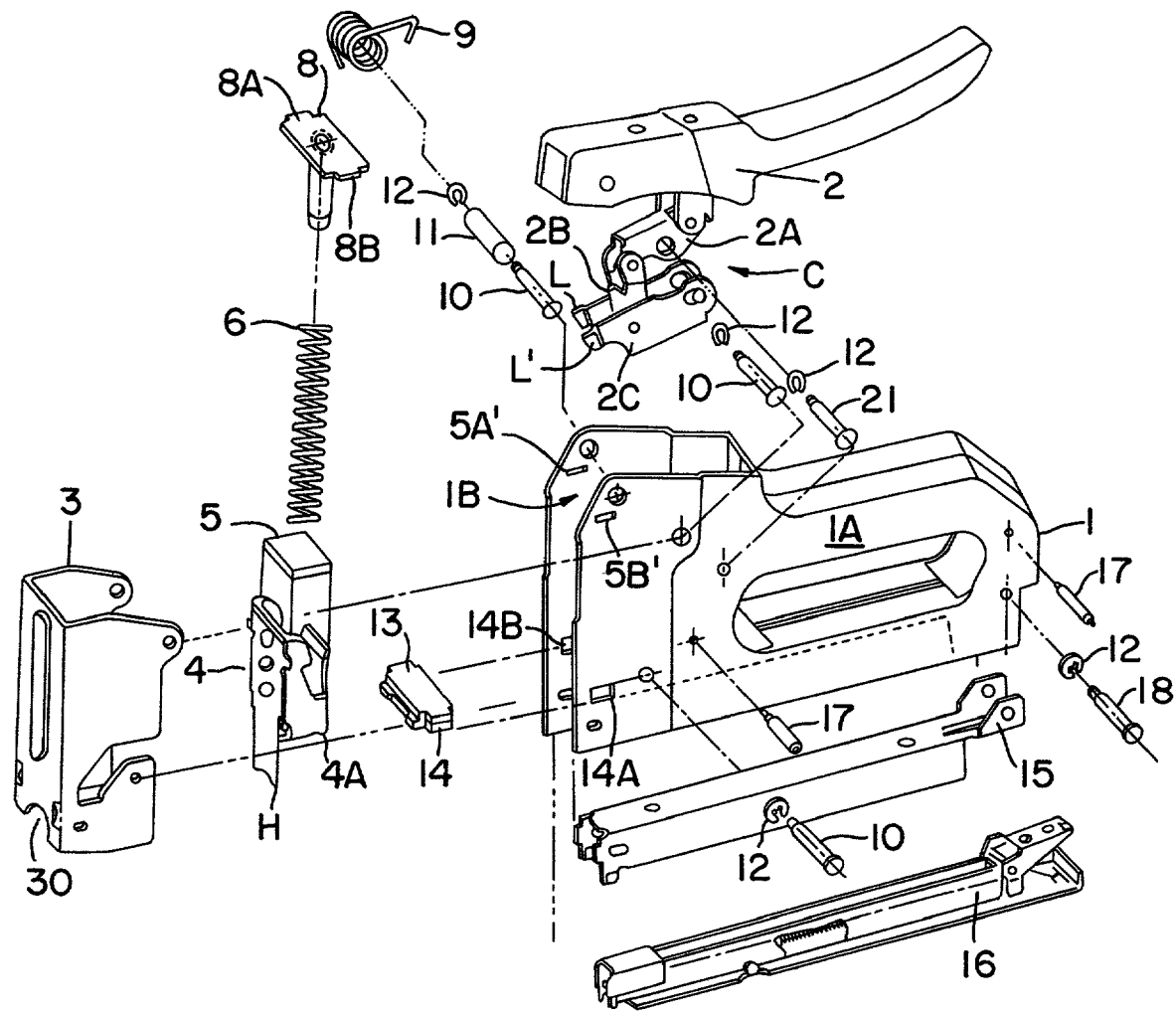
FIG. 1 is an exploded view of a fastening tool in accordance with the present invention.

Turning first to FIG. 1, there is shown one embodiment of the present invention, which is a spring actuated staple gun adapted to drive U-shaped staples housed in a magazine into a surface or substrate. The gun includes a tool body 1 comprised of two stamped nickel-plated sheet metal sides 1A and 1B that form a housing there between. Alternatively, the housing could be a molded body. Pivotally fixed to the underside of a handle 2 is a spring-loaded lever assembly C, substantially located in said housing, which includes extended link 2A and lifter 2C and allows the handle of the gun to be cocked and uncocked in order to actuate the gun. A handle return spring 9 is fixed to the handle 2. Spring retainer 8 has opposite flanges 8A, 8B that align with opposite slots 5A' 5B' in sides 1A and 1B of the tool body 1 to fix spring retainer 8 therein. A driver spring pad 5 aligns with the bottom of the driver spring 6 and sits in the body of drive blade assembly 4. Impact pad 13 has an impact ledge 14 that aligns with opposite slots 14A and 14B in sides 1A and 1B of the tool body 1 to fix the same in the housing, and thereby limit the downward movement of driver blade assembly 4 a predetermined amount by preventing the seat 4A of drive blade assembly 4 from extending past the surface of the impact pad 13. The impact pad 13 thus affects the location of the bottom H of the drive blade in the "rest" (down) position as it relates to the top of the tunnel in the nose piece 3, and thereby prevents the drive blade from driving the staple too tightly over the wire regardless of the wire diameter. Nose piece 3 secures over the drive blade assembly 4 as is conventional in the art. Magazine assembly 15 combines with pusher assembly 16 to selectively provide the supply of fasteners into the path of the driver blade.

Pressing downward on the handle 2 first causes a pair of opposite lips L, L' of lifter 2C, which lips engage the drive blade assembly 4, to lift the drive blade assembly 4 upward against the bias of driver spring 6. Further downward pressure of the handle 2 causes the lips L, L' to release from the drive blade assembly 4, thereby causing the driver spring 6 to force the drive blade assembly 4 downward. The downward force imparted to the drive blade assembly 4 by the spring 6 causes the head H of the drive blade assembly to strike a staple located at the forwardmost end of the magazine assembly 15 and in the path of the drive blade, and drive the staple into the work surface below. Those skilled in the art will recognize that other ways to actuate the drive blade, including any stored energy source (such as leaf springs, torsion springs, electricity, hydraulics and compressed gas (e.g. air)) can be used.

Figure 2:
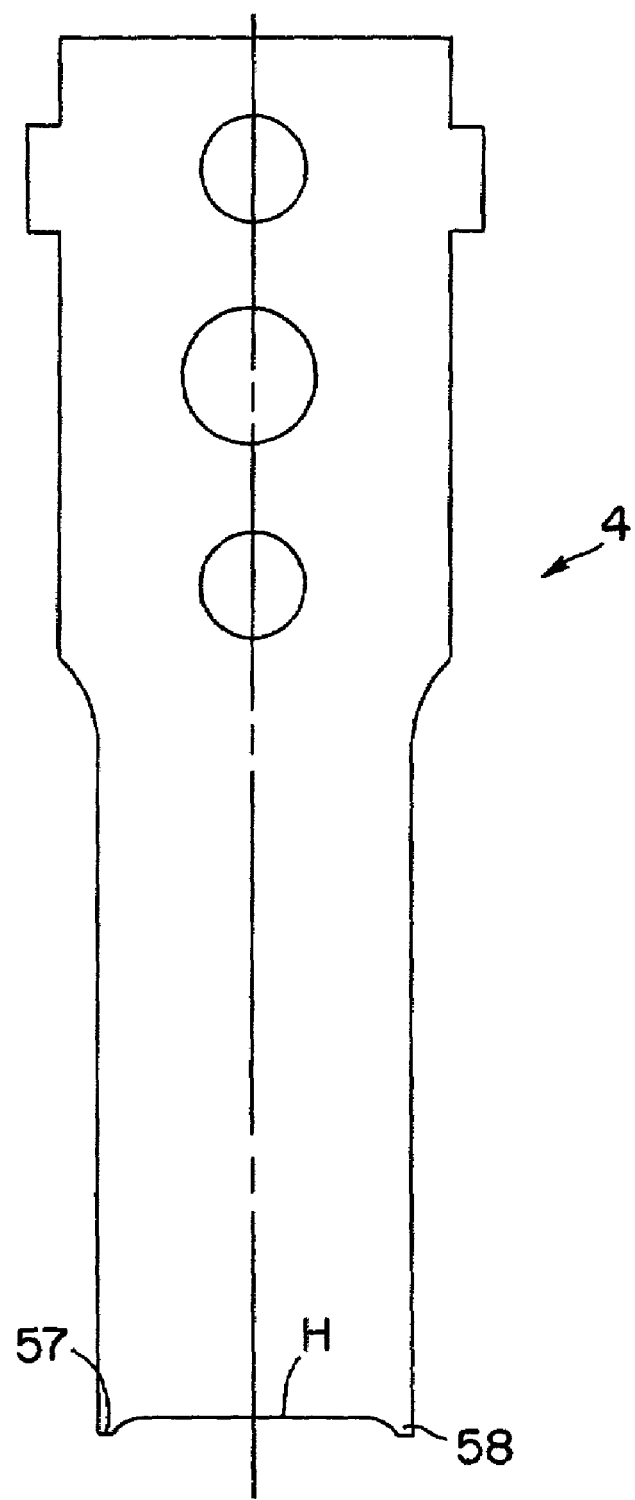
FIG. 2 is a front or back view of the drive blade in accordance with the present invention.
Figure 3:
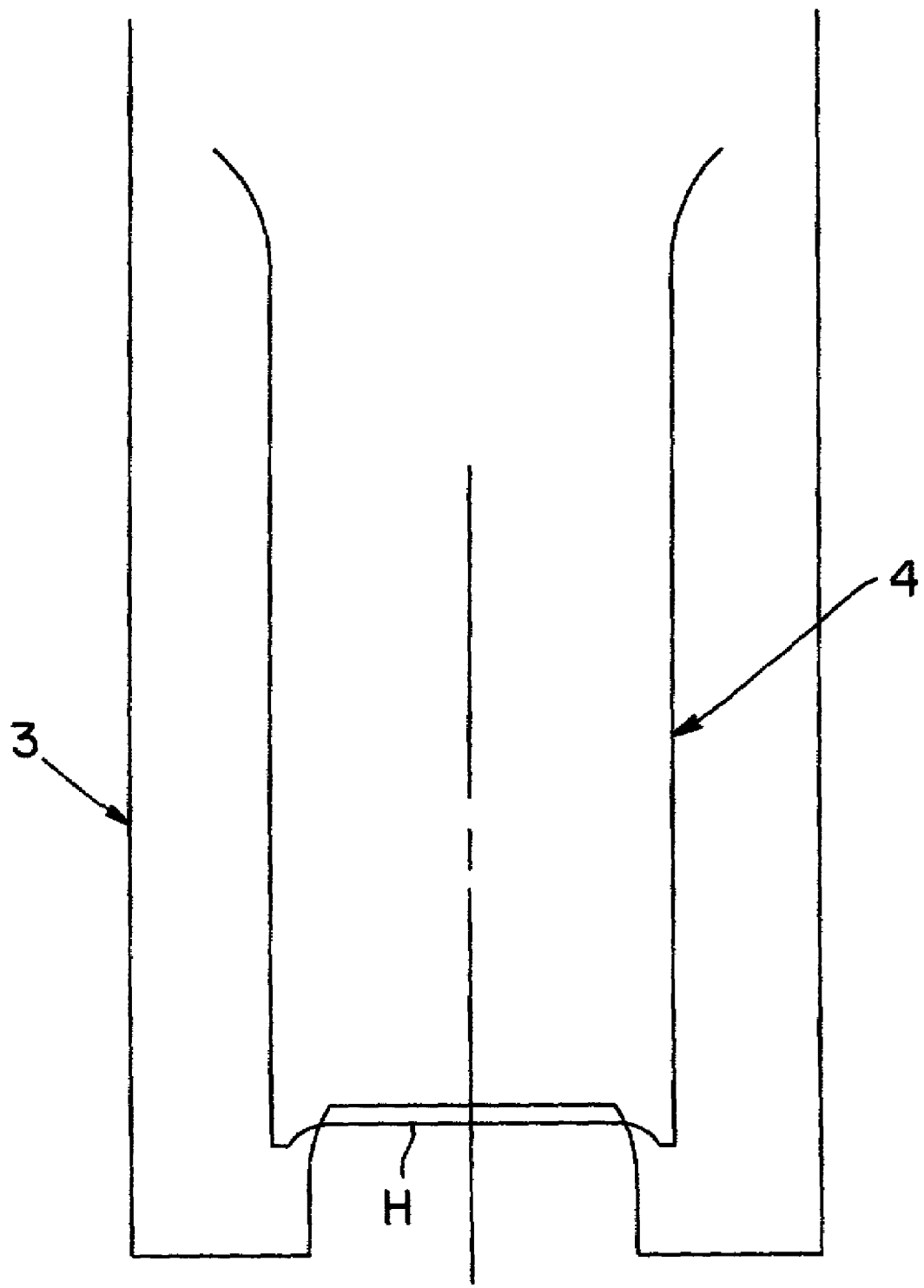
FIG. 3 is a front view of the drive blade and nose piece in accordance with the present invention.

Turning now to FIGS. 2 and 3, the details of the modified drive blade are shown. The head H of the drive blade 4 is configured to correspond in shape to the top (or crown) portion of the staple 53, and the radiused transitional areas (shoulders) 56 which join the crown to the staple legs 51,52, so that upon impact, the drive blade 4 squarely engages the staple crown and shoulder portions and forces the staple straight out of the tool and into the substrate. Thus, the center portion of the head H is recessed slightly, with spaced opposite tips 57, 58 extending lower than the recessed portion, and being radiused as shown. The length of the blade 4 is predetermined and depends in part on the length of the staple and the characteristics of the substrate into which the staple is being driven, so that the staple does not penetrate into the substrate too deeply. Typical substrates include standard wood building materials used in studs, joists, rafters, etc. Nose piece 3 secures over the drive blade 4. At its sides, the nose piece 3 extends below the drive blade as shown in FIG. 3. A U-shaped notch 30 is carved out of the bottom of the nose piece 3. This notch 30 provides a receptacle and guide for the wire or other object to be fastened to be positioned relative to the staple gun. The bottom of the drive blade 4 at rest is level with the top of the notch 30 of the nose piece 3. This level orientation of the drive blade 4 and notch 30 is critical to insuring that the staple gun does not drive the fastener too deeply, thereby possibly crushing, damaging or deforming the object to be fastened. This relationship also prevents damage to the object if the staple gun is fired on a cable without staples in the magazine. This distance may vary, based on varying the thickness of the crown portion of the fastener.

Figure 4:
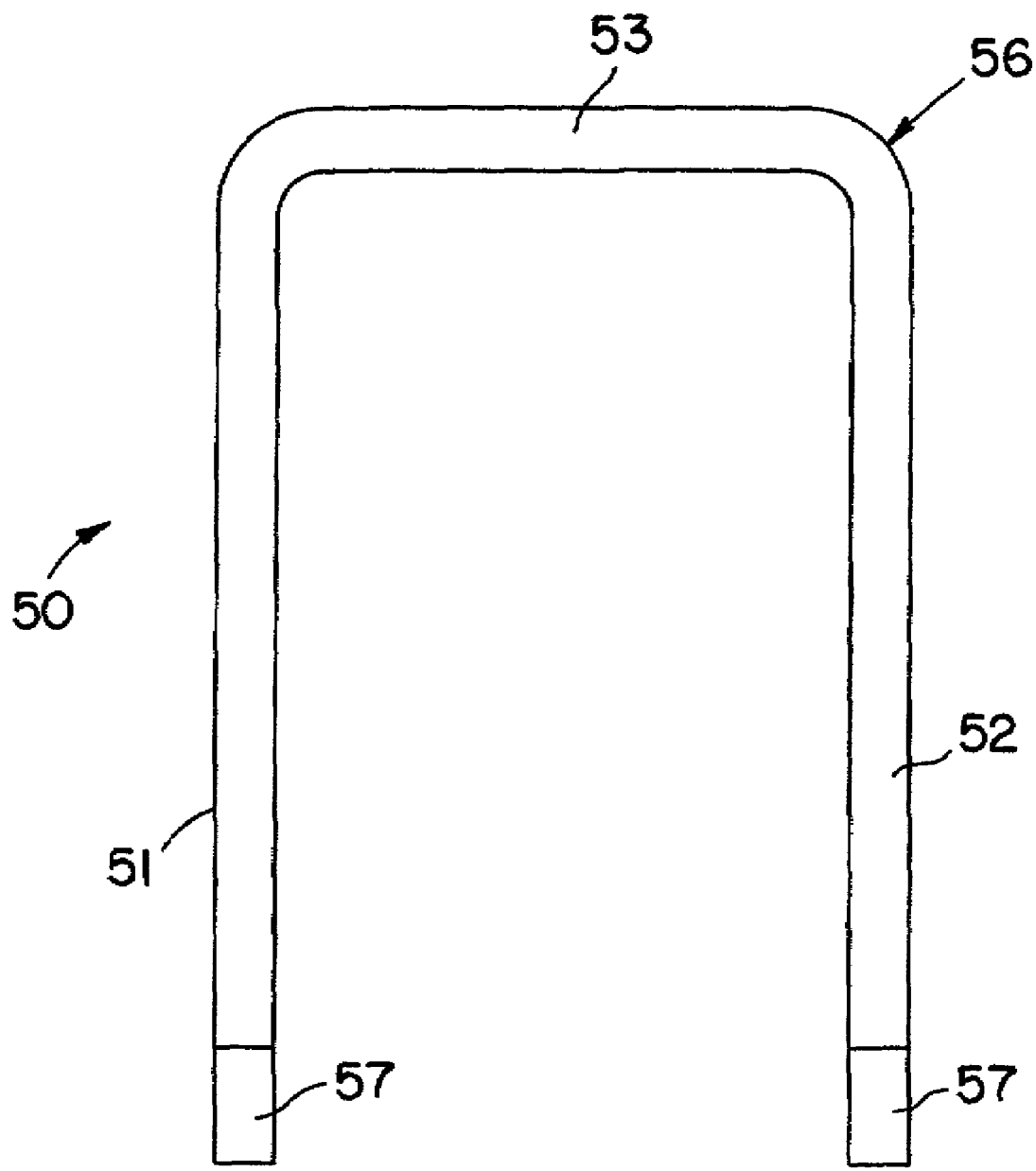
FIG. 4 is a front or back view of the staple in accordance with the present invention.
Figure 5:
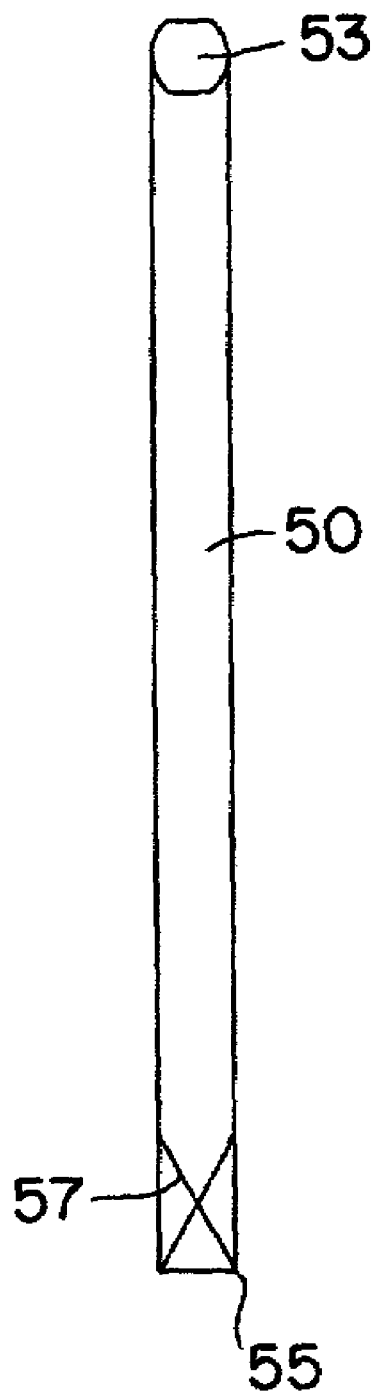
FIG. 5 is a side view of the staple of FIG. 4 in accordance with the present invention.

Turning now to FIGS. 4 and 5, the insulated or coated staple of the present invention is shown. The staple 50 is generally U-shaped, and includes two parallel or substantially parallel vertically extending legs 51, 52, joined by crown 53 and radiused shoulder portion 56. The crown portion 53 is substantially flat, with radiused shoulder areas 56 leading to the parallel legs 51, 52. Preferably the free end (point) of each staple leg 51, 52 terminates, through an angled cut 57, in a sharp edge (point) 55 to facilitate penetration into the substrate. Also, preferably, the angle cuts 57 to the points 55 are mirror images of one another (as shown). These mirror image angle cuts 57 cause the staple legs to move in opposite directions upon penetration into the substrate, making the staple more difficult to extract from the substrate, resulting in additional holding power of the staple.

The degree of angle cut will vary based on the application, and will be easily determinable by one well versed in the art of staple manufacture. An angle cut of 45° has been found to be suitable for this application.

The coating for the staple 50 is made of a material that is insulating and/or cushioning and forms a strong bond with the base metal of the fastener or staple. Suitable base metals include, without limitation, bright steel and galvanized steel. The coating material cannot be too brittle, or it will tear during the staple forming process. It is preferred that the coating material be different from the wire material. Nylon, or plastics containing nylon material, including without limitation polyacetal, polymide, polycarbonate, polyethylene, polypropylene, polyurethane, polyvinylchloride, polyvinylidene fluoride, and blends and combinations thereof, are particular preferred for the coating. Coating with nylon provides insulation. It also provides, depending upon the thickness of the coating, cushioning so that upon impact of the staple with the wire or cable being fastened, the wire is even less likely to be crushed, damaged or deformed, which could cause short circuits or other deleterious effects on the electrical current being transmitted. In addition, penetration of the staple leg 51,52 into the substrate causes the wood fibers adjacent to the staple leg 51,52 to, in effect, act as barbs in the coating material, thereby making the staple leg more difficult to extract, thereby resulting in additional holding power. Preferably the coating is of a uniform thickness of from a minimum of about 1000 mils to a maximum that will vary based on the staple leg length, the dimension of the article to be attached to the substrate, and the substrate into which the article is to be attached. In the current application this maximum thickness has been found to be 0.050 inches. A thickness of from about 0.001 inches to about 0.010 inches is preferred. Preferably all of the staple, or at least the portion contacting the wire or other item to be attached, is coated, although the faces 57 of angled edges of each leg 51, 52 may be devoid of coating since they are formed by cutting the wire after it is coated. The coating adheres to the wire and forms an integral unitary structure. Although the staple wire and coating perform different functions (e.g., the wire staple provides strength while the coating provides holding power in the substrate and has electrical insulating properties while also providing a protective barrier to prevent the wire staple material from damaging the electrical wire being stapled), the adhesion of the coating on the wire is such that the coating does not engage in substantial independent movement relative to the wire once the coating is adhered, even upon application of the fastener in the substrate. Such independent movement would adversely affect the functioning of the fastener.

The coating can be extruded onto the wire prior to the staple-forming process. The coating can also be applied by spraying, dipping or other processes well known to those versed in the art of wire coating. The base wire (e.g., galvanized steel) is made first using conventional wire drawing processes, and then the coating (e.g., nylon) is applied around the wire in a subsequent process.

Other suitable coatings include, without limitation, dielectric materials such as thermoplastic elastomers, including polyethylene, polypropylene, polybutylene, PVC, CPVC, nylon, ABS and PVDF, with nylon being preferred.

In view of the dimension of the coating, the staples can be accommodated by conventional staple tacker gun magazines with little or no modification thereof. Any modifications deemed necessary to accommodate the increased outer width and decreased inner width of the staple resulting from the coating are generally well within the skill of those versed in the art of staple tacker gun manufacture.

The staple gun of the preferred embodiment of the present invention is adapted to drive U-shaped staples (releasably interconnected in the staple magazine) into a substrate in order to secure an object such as wire, cable or tubing to the substrate.

Those skilled in the art will recognize that any stored energy source can be used to actuate the driver of the fastening tool, including, without limitation, mechanical means, compressed air, electric means, hydraulics, etc.

In operation, the fastening tool of the preferred embodiment of the present invention is used as follows. First, cohered cores of articles such as fasteners (e.g., insulated or coated staples) are loaded into the magazine. Staples in these cores are preferably cohered in a side-by-side relation. The tool is then aligned over the object to be fastened. Upon actuation of the driver, fasteners are expelled from the magazine, one at a time, around the object to be fastened on three sides and into the substrate. The staple pusher in the magazine assembly automatically urges the next article (e.g., coated staple) into axial alignment with the drive path to be expelled by the next complete drive stroke.

What is claimed is:

1. A fastening tool and fasteners for fastening an object to a substrate, said tool comprising:
   a housing;
   a driver mounted in said housing for reciprocal movement in a drive path;
   an actuator for actuating said driver;
   a magazine assembly associated with said housing, said magazine assembly containing one or more individual uniformly coated fasteners, including a forwardmost fastener, each individual fastener forming a unitary structure with said coating, said magazine assembly having a nose end and a tail end spaced from said nose end;
   a pusher in said magazine assembly for urging said plurality of fasteners towards said nose end such that said forwardmost fastener is aligned in said drive path.

2. The fastening tool and fasteners of claim 1, wherein said coating on said fasteners is electrically insulating.

3. The fastening tool and fasteners of claim 1, wherein said coating on said fasteners has cushioning properties.

4. The fastening tool and fasteners of claim 1, wherein said one or more fasteners are staples.

5. The fastening tool and fasteners of claim 1, wherein said coating is selected from the group consisting of nylon, polyethylene, polypropylene, polybutylene , PVC, CPVC, ABS and PVDF.

6. The fastening tool and fasteners of claim 1, wherein said coating is nylon.

7. The fastening tool and fasteners of claim 1, wherein said magazine assembly is detachably secured to said housing.

8. The fastening tool and fasteners of claim 1, wherein said object to be fastened is selected from the group consisting of wire, cable and tubing.

9. An insulated staple for securing a wire to a substrate, comprising:
   a staple body formed into a bight portion; and a pair of legs extending from said bight portion, each leg terminating in a free end; and
   a dielectric coating uniformly coated on said staple body prior to formation into said bight portion and said pair of legs, said coating adhering to said bight portion and pair of legs after formation into said bight portion and pair of legs so as to form an integral unitary structure.

10. The insulated staple of claim 9, wherein said coating remains stationary on said staple.

11. The insulated staple of claim 9, wherein said coating has a thickness of from about 0.001 inches to about 0.050 inches.

12. The insulated staple of claim 9, wherein said staple is made of bright or galvanized steel.

13. The insulated staple of claim 9, wherein each said free end terminates in an angled cut to facilitate penetration into said substrate.

14. A method of fastening an article to a substrate, comprising the steps of:
   a) providing a fastening tool comprising:
      a housing;
      a driver mounted in said housing for reciprocal movement in a drive path;
      a magazine assembly associated with said housing, said magazine assembly containing one or more individual uniformly coated fasteners, including a forwardmost fastener, each individual fastener forming a unitary structure with said coating, said magazine assembly having a nose end and a tail end spaced from said nose end; and
   b) properly positioning said fastening tool about said article to be fastened; and
   c) actuating said driver thereby causing said driver to strike said forwardmost coated fastener and propel said forwardmost coated fastener out of said housing and into said substrate about said article.

15. A method of forming an insulated staple for securing a wire to a substrate, comprising:
   providing a staple body adapted to be formed into a bight portion and a pair of legs extending from said bight portion, each leg terminating in a free end;
   providing a uniform coating on said staple body with a dielectric coating prior to formation into said bight portion and said pair of legs;
   forming said staple body into said bight portion and pair of legs, said coating adhering to said bight portion and said pair of legs after formation into said bight portion and pair of legs so as to form an integral unitary structure.

* * * * *